No. 669,879. Patented Mar. 12, 1901.
C. GANZ.
GEARING FOR BICYCLES.
(Application filed Apr. 11, 1900.)

(No Model.)

Witnesses:
C. D. Keiler
W. B. Keefer

Inventor.
Christian Ganz,
By James L. Norris
Atty.

UNITED STATES PATENT OFFICE.

CHRISTIAN GANZ, OF WASHINGTON, DISTRICT OF COLUMBIA, ASSIGNOR OF ONE-HALF TO WILLIAM A. STEIGER, OF NEW YORK, N. Y.

GEARING FOR BICYCLES.

SPECIFICATION forming part of Letters Patent No. 669,879, dated March 12, 1901.

Application filed April 11, 1900. Serial No. 12,476. (No model.)

*To all whom it may concern:*

Be it known that I, CHRISTIAN GANZ, a citizen of the United States, residing at Washington, in the District of Columbia, have invented new and useful Improvements in Gearing for Bicycles, of which the following is a specification.

In United States Patent granted to me May 1, 1900, No. 648,865, I have shown and described certain improvements in chainless bicycles, which consist of a gearing for transmitting power from the pedal-shaft to the driving-wheel comprising two gears secured to the crank or pedal shaft, two pinions meshing with said gears having wrist-pins thereon, pinions on the axle of the driving-wheel, gears meshing with the pinions on said axle provided with wrist-pins and mounted upon a counter-shaft in the fork of the frame in which said driving-wheel is mounted, and pitmen connecting, respectively, the wrist-pins on said pinions and gears.

My present invention is designed as an improvement upon that disclosed in the application referred to, the object of the same being to simplify the construction by dispensing with certain of the parts, and thereby making the machine as a whole lighter in weight and less expensive to manufacture.

In carrying out my invention I dispense with one of the gears on the crank-shaft and one of the pinions which coöperates therewith and instead form the lower end of the seat-post tube of the frame forked or bifurcated, extend the crank-shaft through the branches of the fork or said seat-post tube, secure to the crank-shaft between the branches of the said fork a single gear, and locate within the fork, above said gear, a pinion which is mounted upon a shaft having disks upon the outer ends thereof which are provided with wrist-pins to which the pitmen for transmitting the motion of the crank-shaft to the driving-wheel are connected.

The details of my invention will be set forth hereinafter, and that which I regard as new will be pointed out in the claim.

Figure 1:
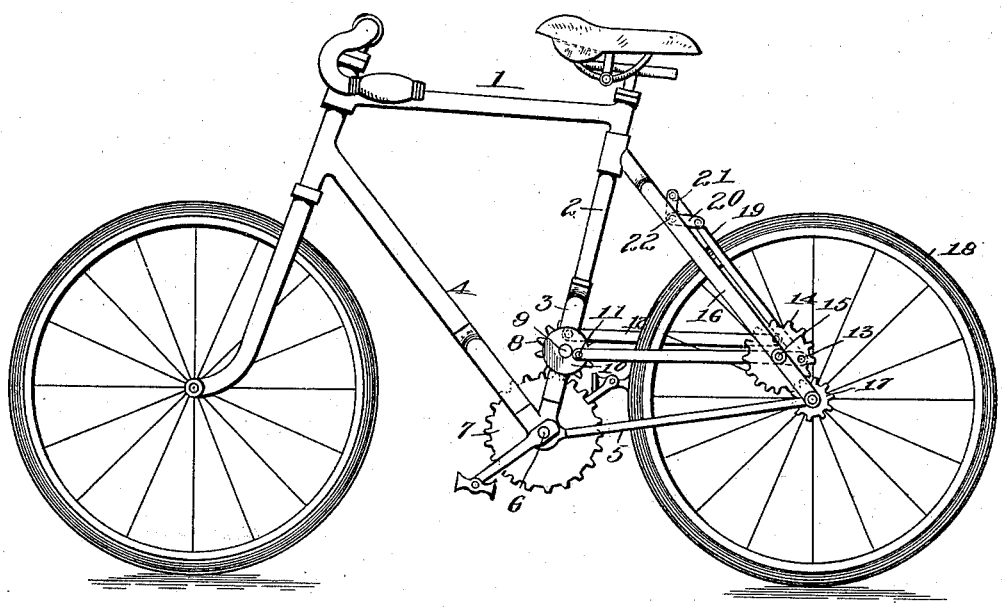
Figure 2:
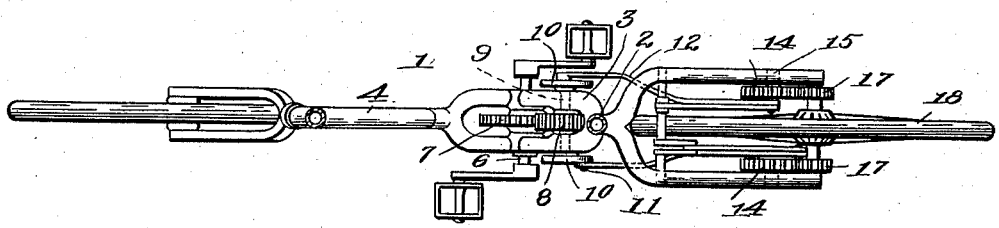

In the drawings forming part of this specification, Figure 1 is a side elevation of a bicycle in which my improvements are embodied. Fig. 2 is a sectional plan view of the machine.

Like reference-numerals indicate like parts in both views.

The frame 1 of the bicycle may be of the usual diamond shape, with the seat-post tube 2 formed with a fork or yoke 3 at its lower end. Extending through the branches of the fork 3, at the intersection of the seat-post tube 2 with the lower reach 4 and the lower runs 5, is the crank-shaft 6, provided with cranks and pedals upon its outer ends. Secured to the crank-shaft 6 and located between the branches of the fork 3 is a spur-gear 7, which meshes with a pinion 8, located above said gear within the fork 3 and mounted upon a shaft or stud 9, having bearings in the branches of the fork 3 and projecting slightly from the outer sides of said branches. On the ends of the shaft or stud 9, outside the fork 3, are secured disks 10 10, having wrist-pins 11 thereon. To these wrist-pins are pivoted the pitmen 12, which extend longitudinally and are pivoted upon wrist-pins 13 upon the gears 14, mounted upon the stud or shaft 15 in the rear fork 16. The said gears 14 mesh with pinions 17, fast upon the axle of the driving-wheel 18. The wrist-pins 13 on the gears 14 have also connected with them the pitmen 19, which extend upwardly parallel with the rear fork 16 and are respectively pivoted to the crank-arms 20 21 on an auxiliary shaft 22, mounted in the rear fork 16.

The pitmen 12, the connections with the rear end thereof, and all the parts connected with the driving-wheel 18 are substantially the same as those described in my former application referred to and are for the same purpose. My improvements consist in the forked seat-post tube with the crank-shaft mounted therein, the single gear secured to said counter-shaft, and the pinion meshing with said gear mounted upon a shaft having disks upon its ends provided with wrist-pins for the connection of pitmen, which transmit the power from the crank-shaft to the driving-wheel.

Having now described my invention, what I claim as new, and desire to secure by Letters Patent, is—

In a bicycle, a seat-post provided with a forked lower end, a crank-shaft journaled therein and provided with suitable pedals, a spur-gear mounted upon said shaft, a shaft 9 journaled in the said fork above said spur-gear and extending outwardly on each side thereof, a pinion mounted upon said shaft 9 and meshing with said gear, a disk secured to each extending end of said shaft 9, a drive-shaft journaled in the rear fork of said bicycle and carrying the drive-wheel, a pair of pinions suitably connected to the axle of said drive-wheel, a shaft 15 secured to each of the rear forks of said bicycle, a gear mounted upon each of the shafts 15 and adapted to mesh with the pinions carried by the drive-wheel, a wrist-pin secured to each of said gears, a pair of longitudinally-extending pitmen connected at one end to said wrist-pins and at their opposite end to said disk, an auxiliary shaft mounted in the rear fork of the bicycle, a pair of crank-arms carried by said shaft, and a pair of pitmen arranged within the rear fork and connected at their upper end to said crank-arms and at their lower end to said wrist-pins, substantially as described.

In testimony whereof I have hereunto set my hand in presence of two subscribing witnesses.

CHRISTIAN GANZ.

Witnesses:
 GEO. W. REA,
 F. B. KEEFER.